United States Patent
Koike

[11] Patent Number: 5,548,670
[45] Date of Patent: Aug. 20, 1996

[54] LIGHT-SCATTERING LIGHT-GUIDING DEVICE

[76] Inventor: Yasuhiro Koike, 534-23 Ichigao-cho, Midori-ku, Yokohama-shi, Kanagawa, 225, Japan

[21] Appl. No.: 256,775
[22] PCT Filed: Nov. 29, 1993
[86] PCT No.: PCT/JP93/01733
§ 371 Date: Jul. 25, 1994
§ 102(e) Date: Jul. 25, 1994
[87] PCT Pub. No.: WO94/12898
PCT Pub. Date: Jun. 9, 1994

[30] Foreign Application Priority Data

Nov. 27, 1992 [JP] Japan ................... 4-341589

[51] Int. Cl.⁶ ........................... G02B 6/26
[52] U.S. Cl. ............... 385/27; 385/31; 385/146
[58] Field of Search .............. 385/27, 31, 39, 385/42, 15, 28, 29, 30, 34, 124, 146

[56] References Cited

U.S. PATENT DOCUMENTS 4,660,925  4/1987  McCaughan, Jr. ............. 385/141 X

FOREIGN PATENT DOCUMENTS

| 0559914 | 9/1993 | European Pat. Off. ........ 385/27 |
| 2-84618 | 3/1990 | Japan . |
| 2-221926 | 9/1990 | Japan . |
| 3-35047 | 2/1991 | Japan . |
| 3-294348 | 12/1991 | Japan . |
| 5-45505 | 2/1993 | Japan . |
| 5-241147 | 9/1993 | Japan . |
| 5-249319 | 9/1993 | Japan .................. 385/27 |

Primary Examiner—John D. Lee
Assistant Examiner—Phan T. H. Palmer
Attorney, Agent, or Firm—Staas & Halsey

[57] ABSTRACT

A light-scattering light-guiding device includes a light-scattering light guide having an incident surface, an exit surface from which scattered light is emitted, and a volume region having uniform scattering power. The volume region has an effective scattering illumination parameter E (cm$^{-1}$) whose value satisfies the relation $0.45 \leq E \leq 100$. The light guide has a nonuniform refractive index structure having a correlation function $\gamma(r)$, which is approximated by exp$\{-R/A\}$, where r is the distance between two points in the light guide. This distance a satisfies the relation 0.01 µm $\leq$ a $\leq$ 50 µm. It is not necessary to form a scattering layer of diffusive ink or the like on the rear surface of the light guide. If an exit direction-modifying device having a prismatic cross section is disposed on the side of the exit surface, the flux of the outgoing light directed in a specified direction can be increased. The nonuniform refractive index structure is obtained by kneading together a polymer matrix and a particulate material of a different refractive index, by kneading together two or more kinds of polymers of different refractive indices, or by dispersing a particulate material, utilizing suspension polymerization. The light guide is obtained by a molding process.

4 Claims, 7 Drawing Sheets

| CATEGORY | NAME OF POLYMER | REFRACTIVE INDEX |
|---|---|---|
| MA | 1. PMMA [POLYMETHYL METHACRYLATE] | 1.49 |
|  | 2. PEMA [POLYETHYL METHACRYLATE] | 1.483 |
|  | 3. POLY ( nPMA ) [POLY-N-PROPYL METHACRYLATE] | 1.484 |
|  | 4. POLY ( nBMA ) [POLY-N-BUTYL METHACRYLATE] | 1.483 |
|  | 5. POLY ( nHMA ) [POLY-N-HEXYL METHACRYLATE] | 1.481 |
|  | 6. POLY ( iPMA ) [POLYISOPROPYL METHACRYLATE] | 1.473 |
|  | 7. POLY ( iBMA ) [POLYISOBUTYL METHACRYLATE] | 1.477 |
|  | 8. POLY ( tBMA ) [POLY-T-BUTYL METHACRYLATE] | 1.463 |
|  | 9. PCHMA [POLYCYCLOHEXYL METHACRYLATE] | 1.507 |
| XMA | 10. PBzMA [POLYBENZYL METHACRYLATE] | 1.568 |
|  | 11. PPhMA [POLYPHENYL METHACRYLATE] | 1.57 |
|  | 12. POLY ( 1-PhEMA ) [POLY-1-PHENYLMETHYL METHACRYLATE] | 1.543 |
|  | 13. POLY ( 2-PhEMA ) [POLY-2-PHENYLETHYL METHACRYLATE] | 1.559 |
|  | 14. PFFMA [POLYFURFURYL METHACRYLATE] | 1.538 |
| A | 15. PMA [POLYMETHYL ACRYLATE] | 1.4725 |
|  | 16. PEA [POLYETHYL ACRYLATE] | 1.4685 |
|  | 17. POLY ( nBA ) [POLY-B-BUTYL ACRYLATE] | 1.4535 |
| XA | 18. PBzMA [POLYBENZYL ACRYLATE] | 1.5584 |
|  | 19. POLY ( 2-ClEA ) [POLY-2-CHLOROETHYL ACRYLATE] | 1.52 |

FIG. 7

| CATEGORY | NAME OF POLYMER | REFRACTIVE INDEX |
|---|---|---|
| AC | 20. PVAc [POLYVINYL ACETATE] | 1.47 |
| XA | 21. PVB [POLYVINYL BENZOATE]<br>22. PVAc [POLYVINYL PHENYL ACETATE]<br>23. PVC1Ac [POLYVINYL CHLOROACETATE] | 1.578<br>1.567<br>1.512 |
| N | 24. PAN [POLYACRYLONITRILE]<br>25. POLY (αMAN) [POLY-α-METHYL ACRYLONITRILE] | 1.52<br>1.52 |
| α - A | 26. PMA (2Cl) [POLYMETHYL-α-CHLOROACRYLATE] | 1.5172 |
| St | 27. POLY (o-C1St) [POLY-O-CHLOROSTYRENE]<br>28. POLY (p-FSt) [POLY-P-FLUOROSTYRENE]<br>29. POLY (o, p-FSt) [POLY-O-, P-DIFLUROSTYRENE]<br>30. POLY (p-iPSt) [POLY-P-ISOPROPYL STYRENE]<br>31. PSt [POLYSTYRENE] | 1.6098<br>1.566<br>1.475<br>1.554<br>1.59 |
| C | 32. PC [POLYCARBONATE] | 1.59 |

5,548,670

LIGHT-SCATTERING LIGHT-GUIDING DEVICE

TECHNICAL FIELD

The present invention relates to a light-scattering light-guiding device equipped with a light-scattering light guide capable of radiating scattered light toward the surroundings while guiding the light and, more particularly, to a light-scattering light-guiding device especially adapted for use as a back light source for a liquid crystal display (LCD), and employing a light-scattering light guide having a volume region to which substantially uniform scattering power given.

BACKGROUND ART

Various optical elements and devices, which are designed to guide and direct light in a desired direction by making use of a scattering phenomenon have been heretofore well known and used as back light sources for liquid crystal displays and so forth.

One type of these well-known optical elements and devices uses a two-dimensional light source comprising an elongated plate of a transparent material, wherein light is allowed to enter from one side of the plate of the transparent material and a reflective element is disposed on one surface of the plate while light-scattering property is provided on the other side surface to be used as a light exit surface; this light source is used, for example, as a backlight source for a liquid crystal display. This type is described for example, in Japanese Patent Laid-Open Nos. 235905/1987, 63083/1988, 13925/1990 and 245787/1990.

In the two-dimensional light source using such a light-scattering light-guiding devices, light is not scattered in three dimensions inside a transparent body, but is allowed to spread the direction of outgoing light, by utilizing irregular reflection or specular reflection near the surface of the transparent body or on the reflective element. Therefore, it is difficult, in principle, to sufficiently increase the proportion of scattered light which can be taken from the light-scattering light-guiding device.

Where a two-dimensional light source which introduces light from a side and has a uniform illumination intensity should be obtained, the reflecting power of the reflective element must have a certain gradient, as can be easily understood from the above-cited references. This makes the structure of the light-scattering light-guiding devices complex and bulky. Consequently, the manufacturing cost increases inevitably.

Thus, where this kind of light-scattering light-guiding device is used as a backlight source for a liquid crystal display or the like, some of various requirements such as brightness, the uniformity of the illumination intensity of the two-dimensional light source, thinness, and economy cannot help being sacrificed.

Another type of well-known optical element or device comprises an elongated plate of a transparent material and a particulate substance differing in the transparent material to form a light-guiding plate, the particulate substance is differing in refractive index from the transparent material.

For example, in those light-diffusing plates which are proposed in Japanese Patent Laid-Open Nos. 172801/1989, 207743/1991 and 294348/1989, spherical particles consisting of a silicone resin are dispersed in a transparent material such as PMMA or other resin. Using particulate diameters, particulate concentrations, and other data disclosed in the above-cited references, an effective scattering illumination parameter E (described later) is calculated at 210 to 3000.

These values of the parameter E deviate greatly from the range of from 0.45 to 100, which is a requirement of the present invention. Such values may be used for a light-diffusing plate in which light enters from a vertical direction, but cannot be used for a light-scattering light-guiding device such as one according to the present invention, in which the light of uniform brightness is required to be taken from a light exit surface having a spread.

More specifically, even if light is allowed to enter the above-described well-known light-scattering body from one side, such light-scattering body actually lacks in the function of a light-scattering light guide, i.e., the function to scatter light while guiding it over a considerable distance, with the result that only a limited area of the light exit surface very close to the light incident surface is locally made bright. In consequence, a uniform two-dimensional light source having a sufficiently practical size, i.e., several centimeters to several tens of centimeters, to be used as a backlight source for a liquid crystal display, for example, cannot be accomplished.

Attempts have been made to enhance the uniformity of the brightness of the light exit surface, as described in Japanese Patent Laid-Open Nos. 221924/1990, 221925/1990 and 221926/1990. According to these techniques, one or both of particulate diameter and particulate concentration is or are increased with increase in the distance from a light incident surface. This is equivalent to a scheme in which the value of the effective scattering illumination parameter E is increased with increase in the distance from the light incident surface. However, it is technically difficult to manufacture such a scattering body economically on mass production basis. For example, it is difficult to obtain a light-scattering light guide through a batch process by injection molding techniques.

Japanese Patent Laid-Open No. 145485/1992 discloses a light source comprising a light guide plate with a surface having a printed pattern to diffuse light, wherein the light guide plate consists of a transparent resin containing fine particles. It is described that the brightness at the exit surface of the light guide plate whose surface is not processed to diffuse light is set at 2 to 10% of the brightness of the exit surface of such a light guide plate whose surface is processed so as to diffuse light without containing particles in order to improve the brightness.

That is, the technical concept disclosed in the above-described reference is that more than 90% of the brightness derives from the light-diffusing processing on the surface; the remaining few percent increase of brightness is achieved by light diffusion owing to the inclusion of particles so that the scattering function of the light-scattering light guide itself is no more than an-auxiliary one.

DISCLOSURE OF THE INVENTION

As discussed above, it is difficult to enhance the light utilization efficiency of a prior art light-scattering light-guiding device which is used as a backlight source for a liquid crystal display, where the prior art device comprises a two-dimensional light source having an elongated plate of a transparent material so that the light is allowed to enter from one side of the plate of the transparent material. A reflective element is disposed on one surface of the sheet, a light exit surface provided by providing light-scattering property on the other side surface of the plate. Furthermore, if it is attempted to increase the illuminance at the exit surface, then various auxiliary means are necessary. This increases the thickness of the device. Also, it is inevitable that the manufacturing cost is increased.

In some devices using this transparent plate, a mesh-like or dot-like scattering-reinforcing layer is formed on the rear surface of the transparent plate, in order to increase the ability to scatter light and to make the illuminance distribution uniform, as described previously in connection with the light-scattering light guide designed to obtain its light-scattering ability by including the particulate substance. In this case, if the light-scattering light-guiding device is observed from the side of the exit surface, the meshes of the reinforcing layer or the pattern of dots can be seen through a transparent layer which is undesirable. In order to prevent this, a light-scattering film or the like is placed even on the light exit surface in designing the light-scattering light-guiding device.

Such additional structure results in absorption of light and leads to a decrease in the efficiency at which light is utilized. Also, the structure of the device is rendered complex, and the manufacturing cost increases.

Also, even where a light-scattering light guide capable of scattering light in itself is combined with a light source device for introducing light from one side of this light guide in constituting a light-scattering light-guiding device depending on conventional technique, it has been considered that an additional technical means must be used. More particularly, in the prior art techniques, for example, a gradient is given to the dispersion concentration of a particulate substance dispersed in the light-scattering light guide. Alternatively, a mesh-like or dot-like light-scattering reinforcing layer is formed on the rear surface of the light-scattering light guide, using light-scattering ink or other printing technique. Therefore, it is inevitable that the structure becomes complex and the manufacturing cost increases. The phenomenon that the meshes of the reinforcing layer or the pattern of dots is visible through a transparent layer, though the degree of visibility is not so high as the case where a transparent plate is used but is not negligibly low. Thus, in order to obtain more uniform output light intensity, it is yet necessary to cover the exit surface with a light-diffusing film or the like or to process the exit surface so that it looks like frosted glass. If the concentration of the particulate substance is increased until the rear surface pattern becomes invisible through a transparent layer, strong light scattering takes place near the light source. As a result, a wide two-dimensional light source cannot be obtained.

Such additional means or processing steps, however, do not contribute so conspicuously to the improvement of the light utilization efficiency; rather they cause the structure to become more complex. Especially, where one wants to mass-produce small-sized (especially thin) and lightweight units economically by minimizing the number of manufacturing steps and rationalizing the manufacturing process, such additional means and processing steps become unnegligible impediments.

It is an object of the present invention to provide a light-scattering light-guiding device which is less complex and smaller than the prior art device, has a quite simple structure, has a uniformly bright light exit surface, and is easy to manufacture.

It is another object of the invention to provide a light-scattering light-guiding device which incorporates a light direction-modifying device and is adapted for use as a backlight source for a liquid crystal display that is required to provide a bright light exit surface with considerably small electric energy consumption.

It is a further object of the invention to provide a method of manufacturing a light-scattering light-guiding device by injection molding or extrusion molding in such a way that the material of a light-scattering light guide used in the light-scattering light-guiding device can be selected from a wider range of materials than heretofore, and by employing the injection molding or extrusion molding process that is commonly used for molding plastic materials.

In one embodiment of the present invention, a light-scattering light-guiding device comprises a light-scattering light guide having a surface region for receiving incident light coming from at least one direction, a surface region for producing outgoing scattered light originating from the incident light, and a volume region having substantially uniform scattering power. The effective scattering illumination parameter E ($cm^{-1}$) in this volume region lies in a range of $0.45 \leq E \leq 100$. A correlation function $\gamma(r)$ about a structure having nonuniform refractive index which imparts the aforementioned scattering power to the light-scattering light guide described above is approximately given by $\gamma(r)=\exp[-r/a]$, where r is the distance between two points in the light-scattering light guide. The correlation distance a lies in a range of $0.01\ \mu m \leq a \leq 50\ \mu m$. The structure having nonuniform refractive index is provided by the particles distributed uniformly in the light-scattering light guide. The difference between the refractive index of the particles and the refractive index of the material of the light-scattering light guide is 0.001 or more. The device of the present invention is easy to manufacture and is capable of producing bright outgoing scattered light of high uniformity.

In another embodiment of the invention, a light-scattering light-guiding device comprises a light-scattering light guide having a surface region for receiving incident light coming from at least one direction, a surface region for producing outgoing scattered light originating from the incident light, and a volume region having substantially uniform scattering power. The effective scattering illumination parameter E [$cm^{-1}$] in this volume region lies in a range of $0.45 \leq E \leq 100$. A correlation function $\gamma(r)$ about a structure having nonuniform refractive index which imparts the aforementioned scattering power to the light-scattering light guide described above is approximately given by $\gamma(r)=\exp[-r/a]$, where r is the distance between two points in the light-scattering light guide. The correlation distance a satisfies the relation $0.01\ \mu m \leq a \leq 50\ \mu m$. The light-scattering light guide is made of a material which is prepared by a process including a step of kneading together at least two polymers. The difference between the maximum refractive index and the minimum refractive index is 0.001 or more with respect to the at least two different polymers. The device is easy to manufacture and capable of producing bright outgoing scattered light of high uniformity.

A further embodiment of the invention is based on the basic structures of the embodiments described above and further characterized in that a light exit direction-modifying device is mounted by the side of the above-described surface region for producing outgoing scattered light to a specific direction, whereby the device becomes capable of providing brighter view when viewed from desired direction.

A still other embodiment of the invention is based on the structure of the first-mentioned embodiment and further characterized in that the light-scattering light guide includes a material obtained by molding a material in which the particles are dispersed through a suspension polymerization step. The suspension polymerization is an advantageous technique for dispersing particles in a polymeric material.

A yet other embodiment of the invention exploits kneading and molding steps which are especially easy techniques for dispersing particles in a polymeric material. To make use of these steps, this embodiment is based on the first-mentioned embodiment and further characterized in that the light-scattering light guide consists mainly of a polymeric matrix and that the particles are introduced into the polymeric matrix by a molding process including a kneading step.

BEST MODE FOR CARRYING OUT THE INVENTION

First, the effective scattering illumination parameter E and the correlation distance a which are used to describe the scattering characteristics of a light-scattering light guide in the present specification are described referring to the Debye's theory.

When it is assumed that intensity IO of the light passing through a medium by y (cm) is attenuated to intensity I due to scattering in the medium, the effective scattering illumination parameter E is defined by the following formula (1) or (2):

$$E \text{ [cm}^{-1}] = -[\ln(I/IO)]/y \quad (1)$$

$$E \text{ [cm}^{-1}] = -(1/I) \cdot dI/dy \quad (2)$$

The above formulas (1) and (2) are so-called an integration type expression and a differentiation type expression respectively, and they are physically equivalent. E may also be called turbidity.

In the case where the scattering of the light is caused by the nonuniform structure distributed in the medium, and most of the outgoing light is vertically polarized, which is a normal case (Vv scattering), the intensity of the scattered light is given by the following formula (3):

$$Vv = [(4<\eta^2>\pi^3)/\lambda_0^4] \int_0^\infty C\gamma(r)dr \quad (3)$$

where $$C = [r^2 \sin(vsr)]/vsr \quad (4)$$

It is known that where natural light is allowed to enter, it is appropriate to consider the following formula obtained by multiplying the right side of formula (3) by $(1+\cos^2 v)/2$, taking account of Hh scattering:

$$Ivh = Vv(1+\cos^2 v)/2 \quad (5)$$

where $\lambda O$ is the wavelength of the incident light, $v=(2\pi n)/\lambda O$, $s=2 \sin(v/2)$, n is the refractive index of the medium; $v$ is the scattering angle, $<\eta^2>$ is the means of squares of fluctuations in the dielectric constant of the medium (hereinafter $\tau$ is appropriately used on the condition that $\tau=<\eta^2>$); and $\gamma(r)$ is a correlation function and given by $$\gamma(r) = \exp(-r/a) \quad (6)$$

According to the Debye's theory, where the structure of a medium with nonuniform refractive index is dispersed and split into phases A and B on opposite sides of an interface, the correlation function $\gamma r$), the correlation distance a, the mean of squares of fluctuations in the dielectric constant, and other factors have the following relations with respect to fluctuations in the dielectric constant:

$$a \text{ [cm]} = (4 \text{ V/S}) \cdot \phi A \phi B \quad (7)$$

$$\tau = \phi A \phi B (nA^2 - nB^2)^2 \quad (8)$$

where V is the whole volume, S is the total area of the interface, $\phi A$ and $\phi B$ are the ratios of the volumes of the respective phases A and B, respectively, nA and nB are the refractive indices of the phases A and B.

Assuming that the nonuniform structure consists of a spherical interface having a radius R, the correlation distance a is given by $$a \text{ [cm]} = (4/3) R (1-\phi A) \quad (9)$$

The effective scattering illumination parameter E in the case where the natural light is allowed to enter, when calculated using formula (6) for the correlation function $\gamma(r)$ and formula (5), is given as follows:

$$E = [32a^3 \tau \pi^4 / \tau O^4] \cdot f(b) \quad (10)$$

where $$f(b) = [\{(b+2)^2/b^2(b+1)\} - [2(b+2)/b^3] \cdot \ln(b+1) \quad (11)$$

$$b = 4v^2 a^2 \quad (12)$$

It can be seen from the relations described above that the intensity of scattered light, the angle-dependence of the scattered light intensity, and the effective scattering illumination parameter E can be controlled by varying the correlation distance a and the mean of squares of fluctuations of the dielectric constant $\tau$.

Figure 1:
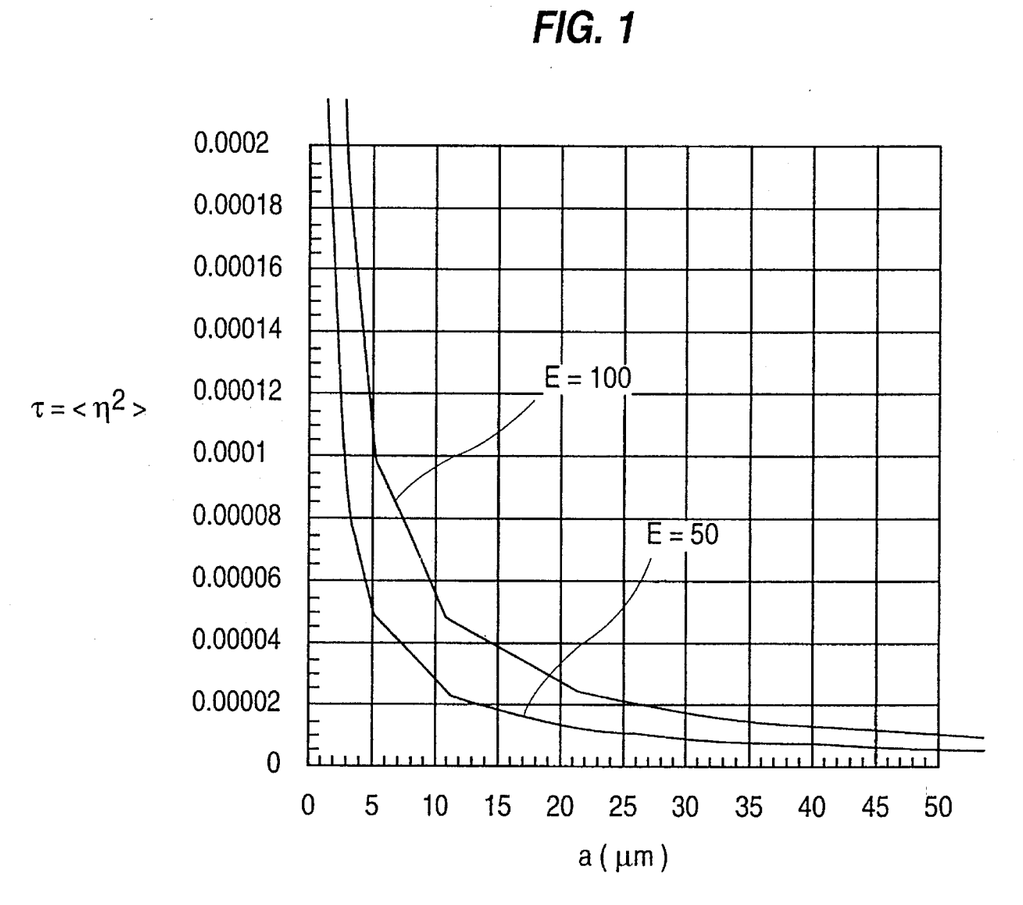
FIG. 1 is a graph in which correlation distance a is plotted on the horizontal axis and dielectric constant fluctuation square average $\tau$ is plotted on the vertical axis under the condition that the effective scattering illumination parameter E is constant, where two curves represent for D=[50 cm$^{-1}$] and E=[100 cm$^{-1}$] respectively.

In FIG. 1, the correlation distance a is plotted on the horizontal axis, and dielectric constant fluctuation squares mean $\tau$ is plotted on the vertical axis. These two curves represent conditions under which the effective scattering illumination parameter E is maintained constant, where E=50 [cm$^{-1}$] and E=100 [cm$^{-1}$], respectively.

In general, the larger the parameter E, the larger the scattering power, and smaller the parameter E, the smaller the scattering power or more particularly, the transparency increases. E=0 corresponds to the condition in which the scattering will not take place at all.

Accordingly, where the light-scattering light guide is used for a two-dimensional light source of a large area, an elongated fiber, a rod-like uniform illumination source, or thelike, the parameter E should be set small. The basic criterion for determining the value is as follows.

For example, where E is approximately 0.001 [[cm$^{-1}$], a fibrous light-scattering light guide having a length of tens of meters can be made to illuminate uniformly. When E=100 [cm$^{-1}$] or so as given in FIG. 1, it is large enough to concentratively and uniformly illuminate an extent of several millimeters to several centimeters.

Also, in the case where E=50[cm$^{-1}$] or so as given in FIG. 1, it is considered to be adequate to cause a light-scattering light guide of moderate size (e.g., several centimeters to tens of centimeters long) to be illuminated uniformly.

In the present invention, the importance is attached to the practicability in the application of backlight sources while taking account of the above-described criteria and selected a range of form 0.45 to 100 cm$^{-1}$.

The correlation distance a is a quantity closely related with the directional characteristic of scattered light in an individual scattering phenomenon occurring inside the light-scattering light guide. More specifically, as can be estimated from the forms of the above formula (3)–(5), light inside a light-scattering light guide generally tends to be scattered forward; however, the intensity of the forward scattering varies depending on the correlation distance a.

Figure 2:
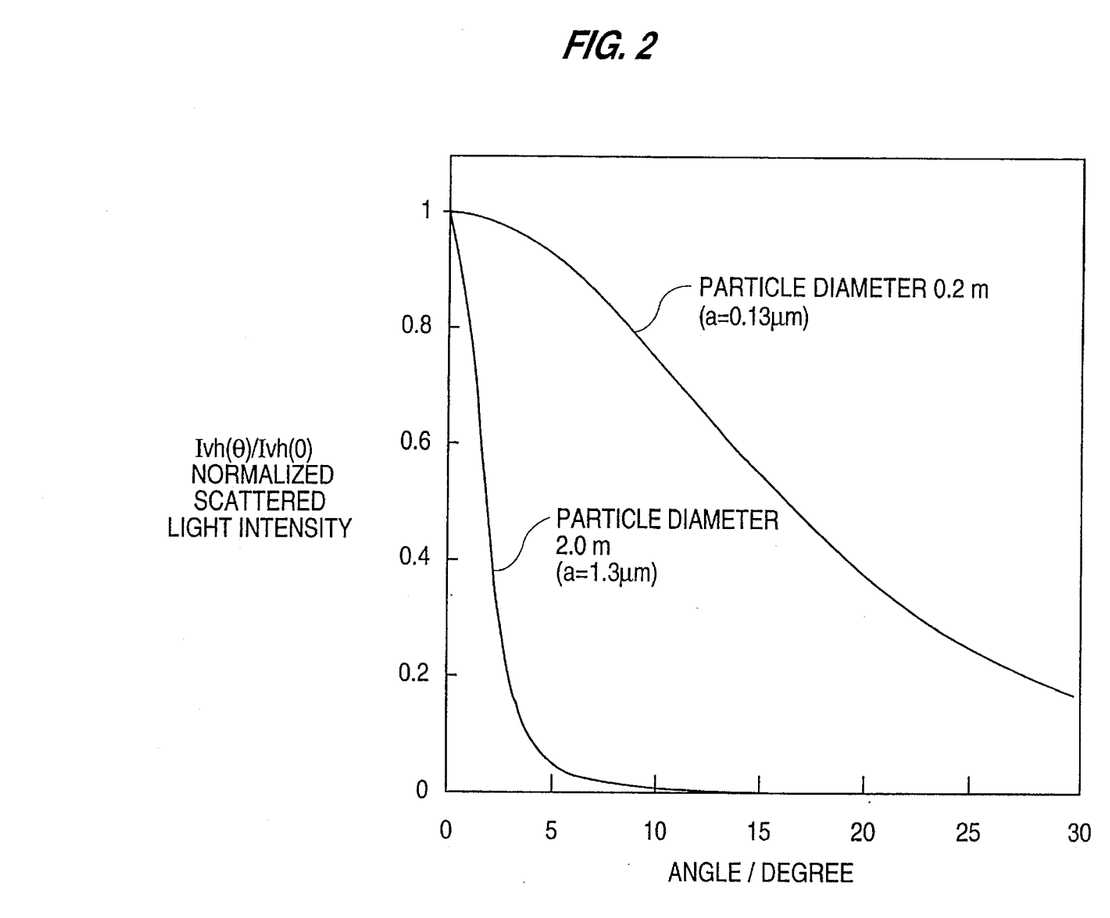
FIG. 2 is a graph in which normalized scattered light intensity is plotted against scattering angle $\theta$ for two values of the correlation distance a and for natural light, where the direction in which incident light propagates is given as $\theta=0°$.

FIG. 2 is a graph, illustrating two values of a. In this diagram, the horizontal axis indicates the scattering angle θ in which the direction of propagation of incident light is given as θ=0°, while the vertical axis indicates the intensity of scattered light when natural light is introduced, i.e., Vvh(θ)/Vvh (O) which is obtained by normalizing formula (5) with θ=0°. As given in the graph, where a=0.13 μm, which is transformed into a particle diameter 2R=0.2 μm, using formula (9), the function of the normalized scattering intensity decreases mildly with θ. However, where a=1.3 μm which is transformed into a particle diameter 2R=2.0 μm using formula (9), the function of the normalized scattering intensity decreases rapidly within a range of small values of θ.

In this way, scattering caused by a nonuniform refractive index structure inside the light-scattering light guide essentially shows a tendency forward scattering. This forward scattering tendency weakens as the correlation distance a decreases, and it can be said that the scattering angle range in one scattering process tends to be extended. This fact has been already demonstrated empirically.

The argument described thus far has been made in terms of scattering phenomena themselves due to nonuniform refractive index structure inside the light-scattering light guide. In order to evaluate the directional characteristic of light actually emitted from the exit surface of the light-scattering light guide, however, it is necessary to take account of both total reflection at the exit surface and the transmissivity for outgoing light, i.e., the ratio at which the light escapes from the light guide.

As is well known through the fundamental optical theories, when light enters the light exit surface from inside the light-scattering light guide, if the critical angle $\alpha_c$ (here, it is assumed that the direction of the normal to the exit surface is 0°) dependent on the refractive indices of media inside and outside the light guide is exceeded by the incident angle of the entering light, the light cannot escape outsides, or into air layer. In the case of PMMA (a refractive index: 1.492), a typical material used in the present invention, $\alpha_c$=42°. For other materials, similar values are obtained.

As described above, the light tends to scatter forward inside the light-scattering light guide, and so it is considered that, in the normal cases where the incident surface is located at a side of the exit surface, the primary scattered light, which occurs when the light entered from the incident surface meets the nonuniform structure, can hardly satisfies the above-described critical angle condition directly.

In other words, we consider that multiple scattering inside the light-scattering light guide, light reflected by the interface on the rear side of the light guide, and light reflected by a reflecting member contribute greatly to the emission of light from the exit surface, although it is essential for the light going out of the exit surface to satisfy the critical angle condition described above.

If so, in terms of the light satisfying the critical angle condition, the tendency of forward scattering which is an attribute of an individual scattering phenomenon is weakened considerably, and the distribution of the light in the direction of propagation must be spread considerably. Therefore, it is considered that the directional characteristic of the light going out of the light-scattering light guide largely depends on the angle dependence of the transmissivity (escape ratio) of the exit surface for the light satisfying the critical angle condition.

In general, the transmissivity is extremely low where the critical angle condition is narrowly met. For example, in the case of acrylic resin-air interface, P-polarized component is about 40% and the S-polarized component is about 20%. If the incident angle goes less than the critical angle, the transmissivity increases sharply. If the incident angle is less than the critical angle by 5° to 10° or more, the transmissivity is kept substantially constant. In the case of acrylic resin-air interface, P-polarized component is 90% or more, and the S-polarized component 85% or more.

From the foregoing, it can be considered that light incident on the exit surface at an incidence angle of about 32° to 37° contributes most to emission of light from the exit surface of the light-scattering light guide. If the refraction at the exit surface is taken into consideration, outgoing light having an incidence angle of about 32° to 37° makes an angle of about 53° to 62° with respect to the normal to the exit surface. (The refractive index of the light guide is approximately 1.5.) That is, roughly estimating, the light going out of the exit surface of the light-scattering light guide has directivity in a direction making an angle of about 30° to 40° with respect to the surface of the exit surface.

It is to be noted that if the correlation distance a is too small, the forward scattering tendency itself decreases. As a result, light is scattered in various directions only by primary scattering, and this causes the directivity to be weakened. The present invention is based on that the directivity of the light going out of the exit surface of the light-scattering light guide varies according to the value of the distance a. Taking account of this, the actual values of the correlation distance a is selected within the range of 0.01 to 50 μm; however, in order to make effective use of a light exit direction-modifying element described below, the distance a is preferred to be larger than 0.05.

Figure 3:
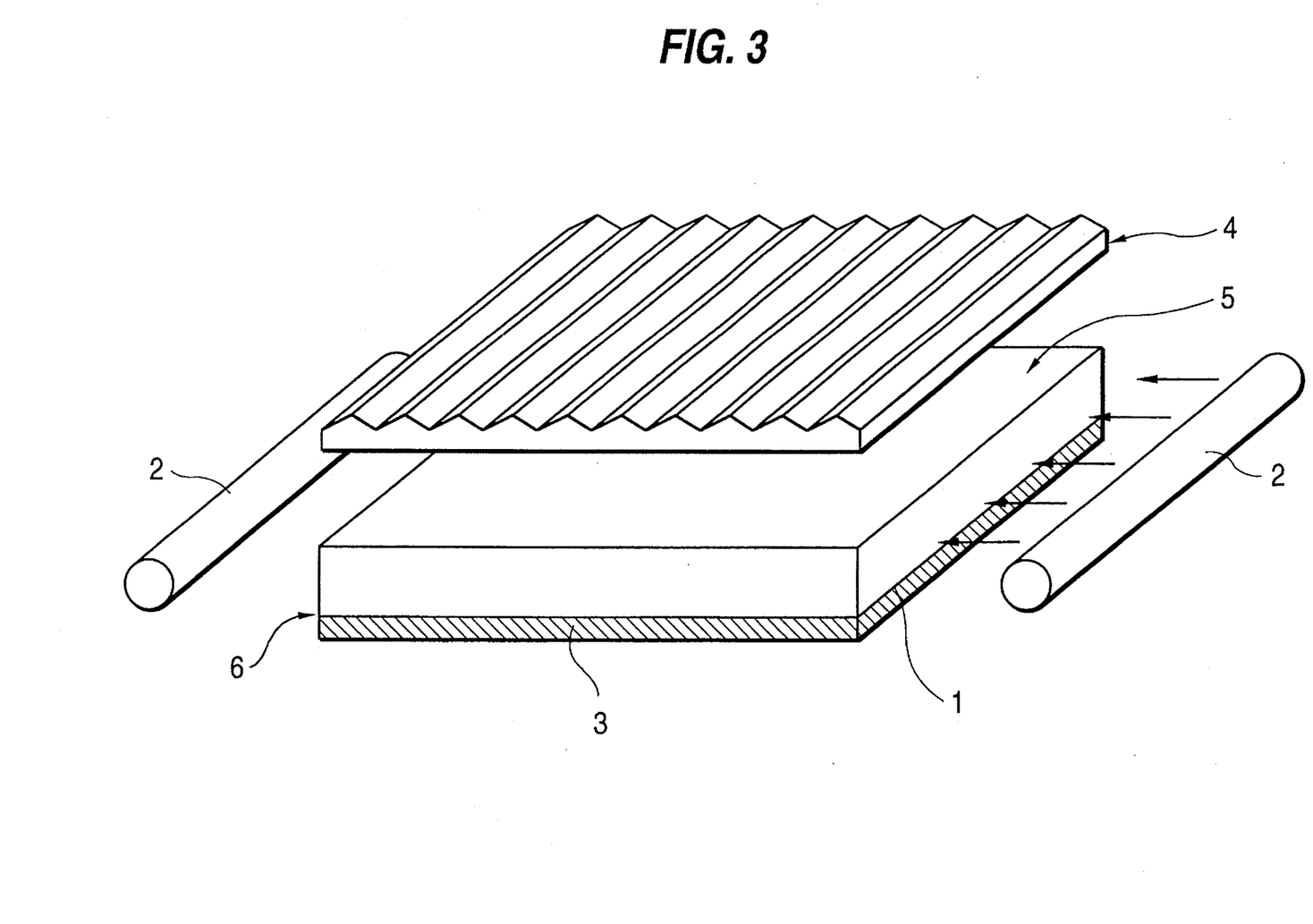
FIG. 3 shows a typical example of a light-scattering light-guiding device according to the invention, arranged for modifying the outgoing scattered light direction characteristic.
Figure 4A:
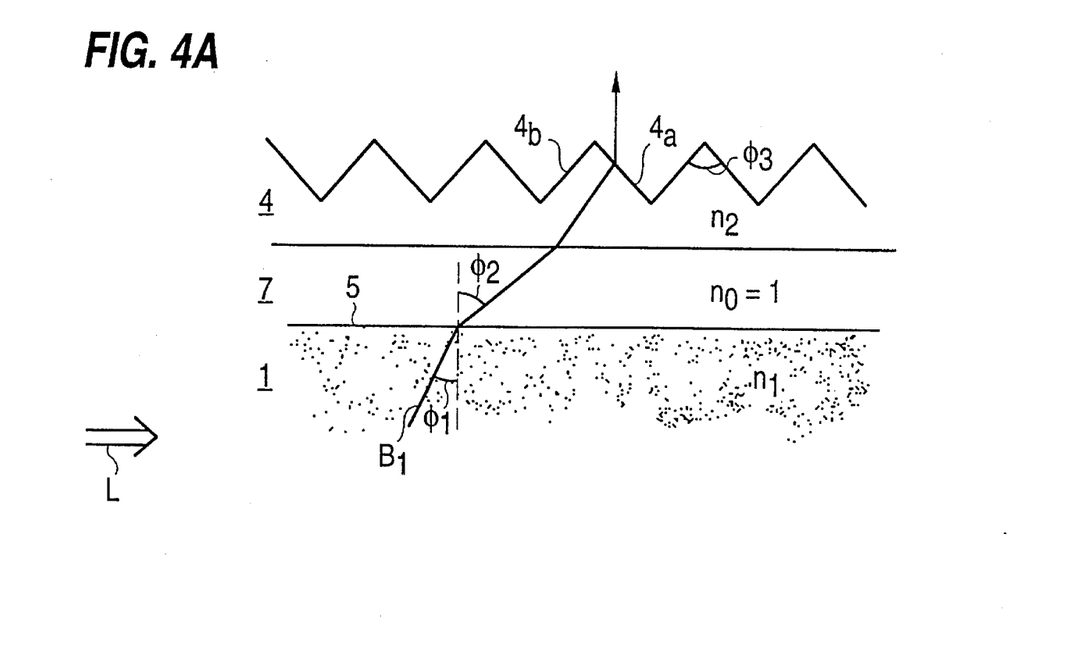
FIG. 4 illustrates the function of an outgoing scattered light direction-modifying element according to the invention.
Figure 4B:
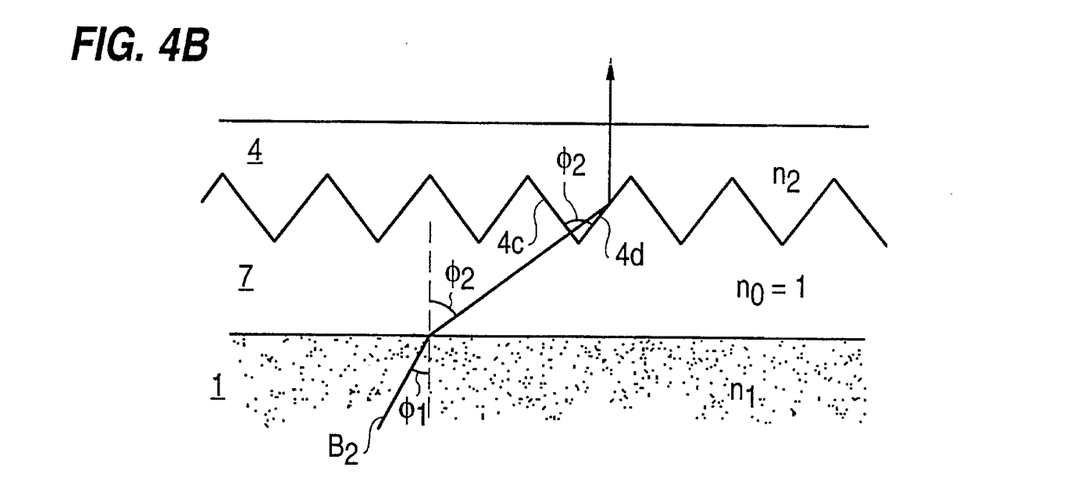

Based on the above conditions, the function of the light exit direction-modifying element according to the present invention referring to FIGS. 3 and 4 is described.

For example, the display screen of a liquid crystal display or the like is normally viewed from a specific direction, usually from the forward or almost forward direction. Therefore, it is desired that scattered light going out of the light-scattering light-guiding device used in a backlight source be distributed mainly in a direction vertical to the exit surface. This requirement can be effectively met by combining the novel light-scattering light guide with the light exit direction-modifying device of the present invention.

FIG. 3 shows a typical example of the arrangement used for modifying direction characteristic of scattered light exiting from the light-scattering light-guiding device as is set forth in claim 1 or 2.

As shown in FIG. 3, numeral 1 denotes a light-scattering light guide. Light sources (fluorescent lamps) 2 are disposed on both sides of the light-scattering light guide. A light exit direction modifying device 4 is disposed on the side of exit surface 5. The rear surface 6 of the light-scattering light guide 1 is optically open. The body of the light-scattering light guide 1 is not provided with either printed light-diffusing ink pattern nor with light-scattering reinforcing treatment such as that for an irregular diffusing surface. However, it might be considered to roughen the surface of the body so that the strong reflection of light emitted from the light sources 2 can be prevented from occurring around the incident area. A reflector 3 separate from the guide 1 is disposed opposite to the rear surface 6, the reflector 3 being made of a white film sheet.

This arrangement is characterized in that the light exit direction-modifying device 4 is disposed on the side of the scattered light exit surface to modify the direction of the outgoing light. This is described in further detail by referring to FIG. 4. As shown in FIG. 4(1), the exit direction-modifying device 4 may be disposed on the side of the exit surface 5 of the light-scattering light guide 1, with its uneven surface facing outside. Also, as shown in FIG. 4(2), the exit direction-modifying device 4 may be disposed on the side of the exit surface 5 of the light-scattering light guide 1, with its uneven surface facing inside. FIG. 3 shows the former arrangement.

In the structure of FIG. 4(1), a typical light beam $B_1$ satisfying the critical angle condition enters the exit surface 5 at an incidence angle $\phi 1$ of 30° to 40°, causing most of the beam to be emitted into an air layer 7. In this case, the angle of outgoing angle $\phi 2$ is 50° to 60° where the refractive index $n_1$ of the light-scattering light guide is about 1.5 and the refractive index $nO$ of the air layer is 1. After passing through the air layer 7, the light beam enters the light exit direction modifying device 4 and takes the refracted route as shown. Then, the beam goes out of a surface 4a of the light exit direction modifying device 4 almost perpendicularly to the exit surface 5. The portion of the beam which exits from other surface 4b is relatively small.

After entering the light exit direction-modifying device 4, the route of the light is affected to some extent by the refractive index n2 of the device and also by the vertical angle $\phi 3$ of the prism and so these parameters had better be selected, according to the actual application of the light-scattering light-guiding device.

In the case of FIG. 4(2), a typical light beam $B_2$ satisfying the critical angle condition enters the exit surface 5 at an angle $\phi 1$ of 30° to 40°. Most of the beam to be emitted into the air layer 7. In this case, the outgoing angle $\phi 2$ is 50° to 60° where the refractive index $n_1$ of the light-scattering light guide is about 1.5 and the refractive index $nO$ of the air layer is 1. The route up to this point is the same as the route shown in FIG. 4(1).

After passing through the air layer 7, the light beam B2 enters the light exit direction-modifying device 4 almost perpendicularly to the prism surface 4a of the modifying device 4. Especially, if the vertical angle $\phi 4$ of the prism is 60° to 80°, the condition is satisfied well. The proportion of the beam entering the opposite surface 4d is relatively small. Therefore, the refraction at the prism surface 4a is very small. The beam B2 is regularly reflected by the opposite prism surface 4d and goes out of the exit direction-modifying device 4 almost perpendicularly to the exit surface 5. If the vertical angle $\phi 4$ of the prism surface is 60° to 80°, the condition can be better satisfied.

Although the exit direction-modifying device 4 is well known, the function cannot be utilized effectively unless light going out of the light-scattering light guide 1 has a considerable degree of directivity. The technical concept for utilizing such directivity, however, is intrinsic in the present invention.

In the cases of conventional light-scattering light guides with the light-scattering patterns printed on their back surfaces, in many instances, the light-diffusing plates are installed on their exit surfaces in order to prevent the light-scattering light-guide from being seen and so the above-described directivity is not obtainable.

The light exit direction-modifying device 4 is not restricted to the illustrated structure having an array of prism surfaces. Rather, the device 4 can take any type. For example, it can be either a film on which triangular pyramidal or dome-like protrusions are distributed or a plate-like device having an array of convex portions each having a semicylindrical cross section, etc.

Also, as a special case, for example, when manufacturing the light-scattering light guide 1, a metal mold with uneven surface may be used to make uneven the exit surface 5 so that the exit surface will be able to serve as a light exit direction modifying device.

Figure 5:
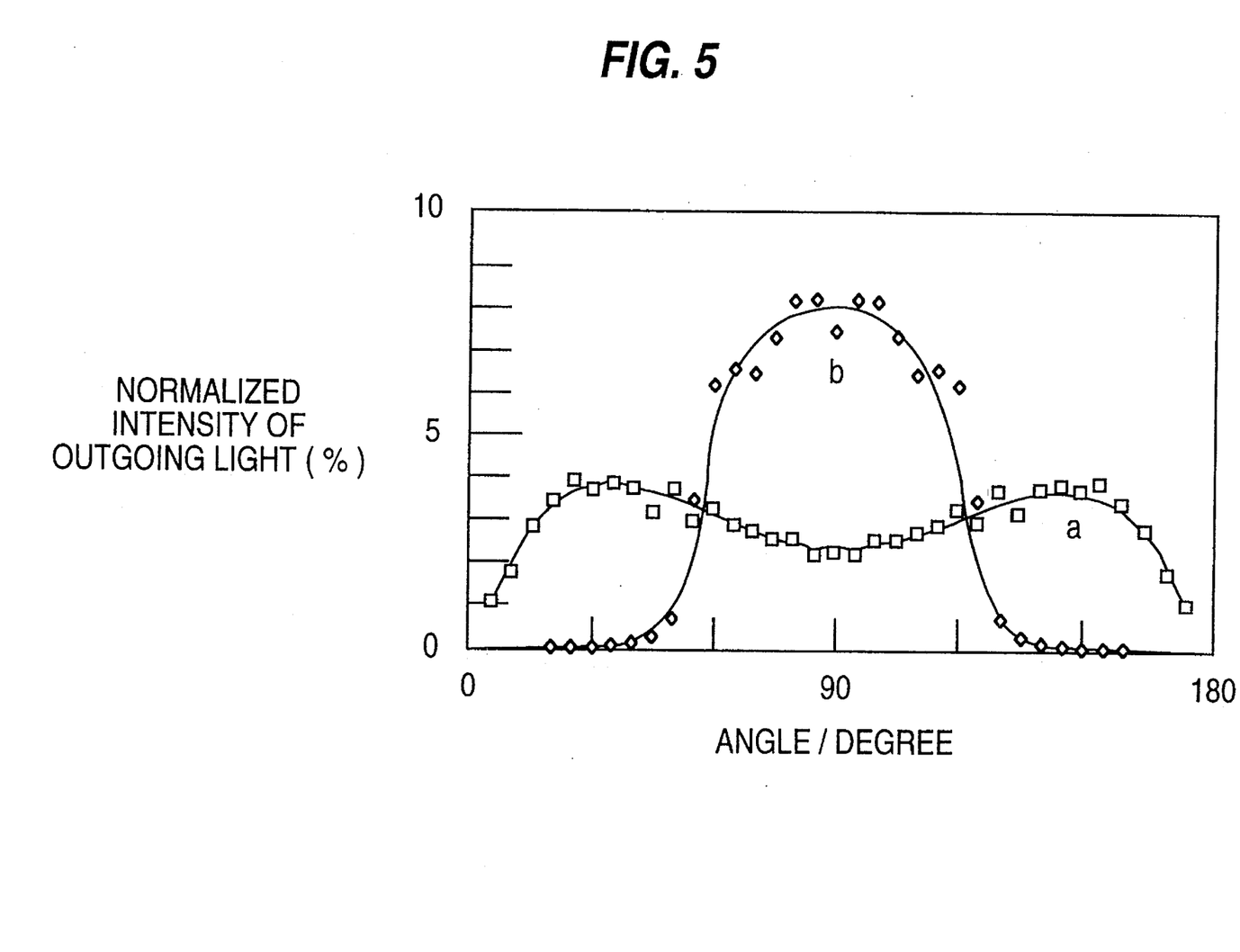
FIG. 5 is a graph showing the results of experiments to prove the function of the outgoing scattered light direction-modifying element shown in FIG. 4.

The operation of the light exit direction-modifying device has been discussed theoretically in the above. FIG. 5 shows an example of experiment conducted to prove the validity of our theoretical considerations. In this diagram, based on the arrangement shown in FIG. 3 but not including the exit direction modifying device 4, the squares represent the measured values of the intensity of the outgoing light plotted along the vertical axis while the angular distances are plotted along the horizontal axis (angle between the normal and the exit surface is 90°). Curve a represents a directional characteristic estimated correspondingly.

Curve a has two similar peaks between 30° and 40° and between 140° and 150°. This matches the result of the aforementioned estimation of the directivity of outgoing light. (Curve a is obtained by superposing curves representing directivities of light arising from various light sources.)

In contrast with the result obtained using the above-described arrangement, the result obtained using the arrangement of FIG. 3 including the light exit direction-modifying device 4 is indicated by the rhombi representing the plotted measured values of the intensity of outgoing light. Curve b represents a directional characteristic estimated correspondingly. As can be seen from the diagram, the directivity of the outgoing light has been modified so that the outgoing light has a definite directivity spreading (in the present example, about 30°) appropriately and symmetrically with respect to the direction of 90°, i.e., the direction toward the front side of the exit surface. Such a characteristic is very desirable for a backlight source for a liquid crystal display.

The materials and manufacturing method of the light-scattering light guide according to the present invention are described now. The light-scattering light guide consists mainly of a polymeric material. Typical examples of the material are listed in FIG. 6 and 7 and include PMMA (polymethyl methacrylate), PSt (polystyrene), and PC (polycarbonate), etc.

One method of preparing the materials of the light-scattering light guide uses a molding process including a step of kneading together two or more polymers. The above process for kneading together two or more different polymers may be regarded as a polymer blending process. The essential feature of the structure defined by claim 2 is that the materials of the light-scattering light guide is composed of the materials selected from among those whose refractive indices differ substantially, or by 0.001 or more.

More specifically, two or more polymeric materials having different refractive indices are mixed, heated, and kneaded. The materials can take any desired shape. Industrially, the shape can be of pellet. The kneaded liquid mixture is injected into the mold cavity of an injection molding machine under a high pressure. Then, the material is cooled and solidified, thereby molding the light-scattering light guide. The molded guide is withdrawn from the mold. In this way, the light-scattering light guide conforming to the shape of the mold can be obtained. The two or more polymers kneaded are solidified without being completely mixed up. Therefore, the concentrations of the materials are not uniform throughout (or locally fluctuated), and this condition is fixed. Therefore, if the kneaded polymers are substantially different in refractive index, then a light-scattering light guide of nonuniform refractive index is produced.

If the kneaded materials are injected into the cylinder of an extrusion molding machine, and an ordinary extrusion operation is carried out, then a desired molded product can be obtained.

The method of blending these polymers and the proportions of the materials can be selected from a very wide range, and they may be determined, taking account of the difference in refractive index between the materials and the strength and the properties (to be represented in terms of the effective scattering illumination parameter E, the correlation distance a, and the mean $\tau$ of squares of fluctuations of dielectric constant) of the nonuniform refractive index structure to be created by the molding process.

Figure 6:
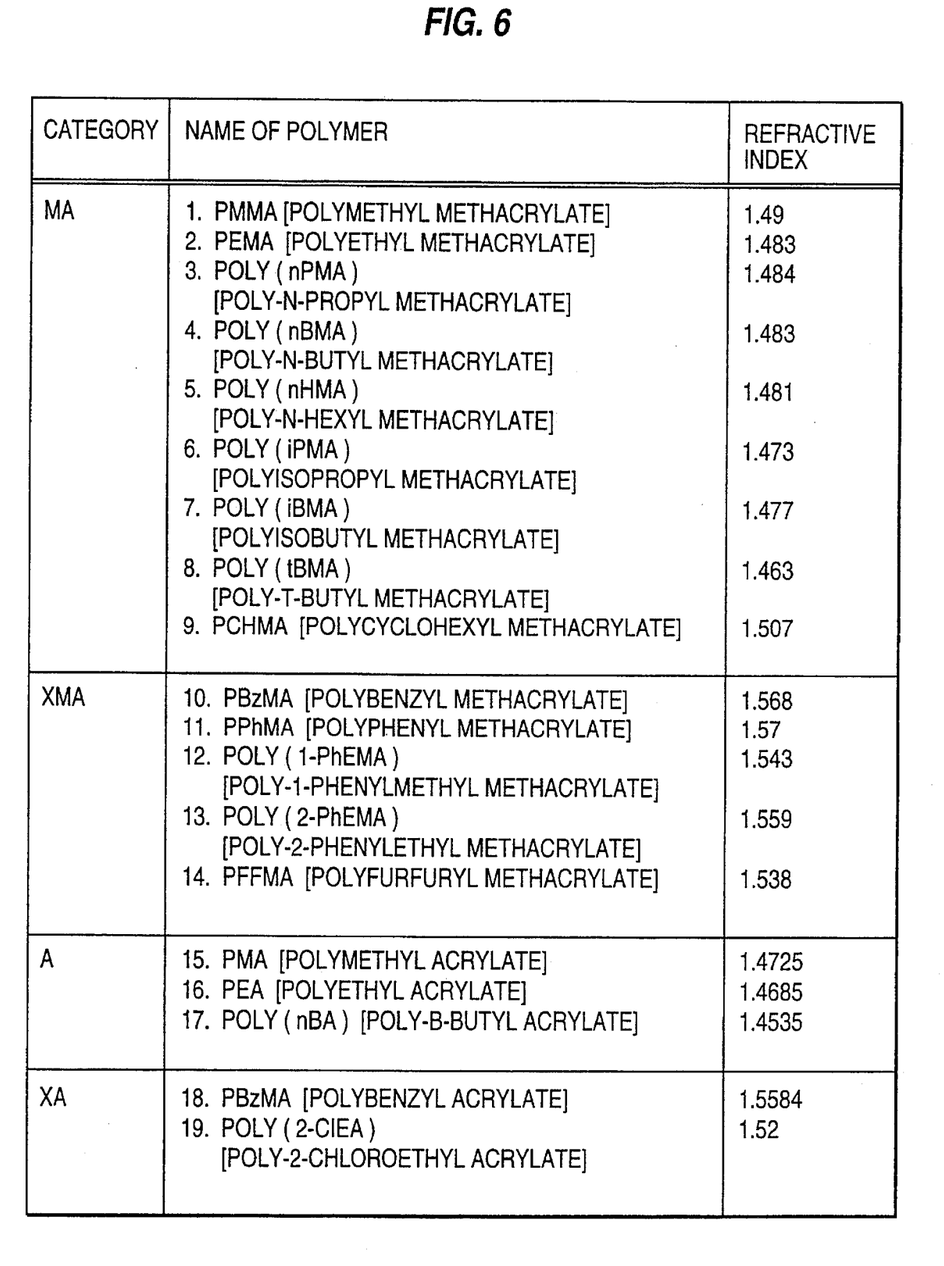
FIGS. 6 and 7 are the tables respectively listing the names of polymers usable as the light-scattering light guide according to the present invention.
Figure 7:
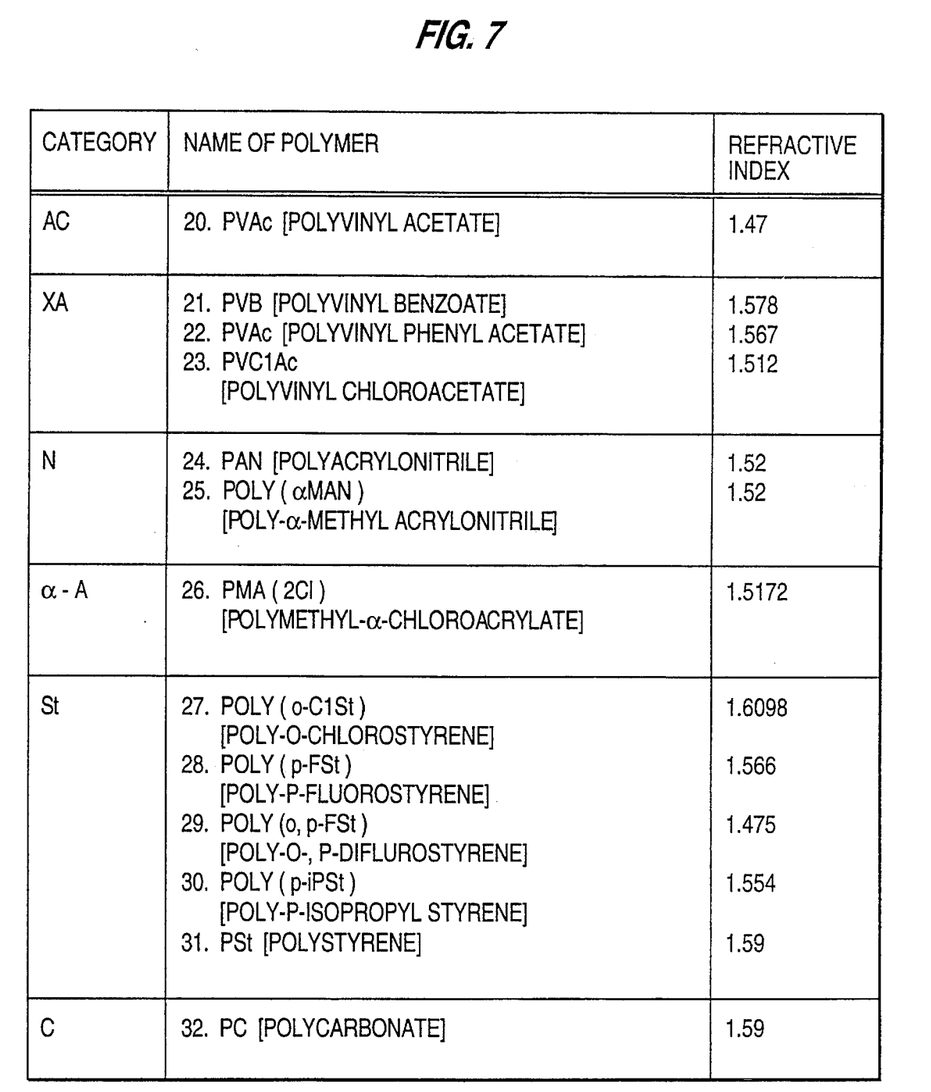

Typical examples of usable polymeric materials are listed of FIGS. 6 and 7. It is to be noted, however, that these materials are only exemplary and that the material of the novel light-scattering light guide is not restricted to these listed materials.

Another example of the method for preparing the material of the light-scattering light guide is one in which particles are uniformly dispersed in a polymeric material, the difference between the refractive index of the polymeric material and the refractive index of the particulate material being 0.001 or more.

One of the methods available for uniformly dispersing a particulate material is called suspension polymerization method. More particularly, the particulate material is mixed into a monomer and then suspended in hot water. Under this condition, a polymerization reaction is performed. In this way, a polymeric material containing uniformly dispersed particulate material can be obtained. A light-scattering light guide of a desired shape and properties can be obtained by using such materials as a raw material.

Thus, where plural number of materials are made available by processing various combinations of different particulate materials and monomers (combinations of different concentrations, sizes and refractive indices of particles) using the suspension polymerization method. The light-scattering light guides having different characteristics can be produced by selectively blending these different materials. Also, the concentration of the particles can easily be controlled by adding the polymer not containing particulate material.

Another method available for uniformly dispersing a particulate material is to knead together a polymeric material and the particulate material. In this case too, the light-scattering light guides having various characteristics can be manufactured by applying kneading and molding process (pelletization) to various combinations of particulate materials and monomers (combinations of particulate concentrations, particle diameters, refractive indices, and other factors) whereby plural kinds of materials can be made available for blending them selectively, and molding the selected materials into desired shapes.

Furthermore, the above-described polymer blend method and the particulate material mixing-in method can be combined. For example, it can be considered to add a particulate material during the blending or kneading process of the polymers having different refractive indices. Some specific examples of the invention are given below.

EXAMPLE 1

First, 0.3% by weight of powdered silicone resin (such as Tospal 108 manufactured by Toshiba Silicon) having a particle diameter of 0.8 μm was added to pellets of methacrylic resin (such as Derbet 8ON manufactured by ASAHI CHEMICAL INDUSTRY CO., LTD, Japan), and they were mixed well for mutual dispersion by using a mixer. The mixture was shaped into strands by an extruding machine. The strands were pelletized by a pelletizer. In this way, pellets in which the powdered silicone resin was uniformly dispersed were prepared.

These pellets were molded into a light-scattering light guide in the form of a flat plate measuring 56 mm long 75 mm wide, by 4.5 mm thick by using an injection molding machine at a cylinder temperature of 230° C. to 260° C. and a mold temperature of 50° C.

This light-scattering light guide was used as the light-scattering light guide 1 employed in the arrangement shown in FIG. 3. In this way, the fundamental arrangement of the light-scattering light-guiding device was built. A prism film having a vertical angle of about 110° was used as the light exit direction-modifying device 4. Reflective film (not shown) was placed around each fluorescent lamp 2 except for the sides facing the light-scattering light guide 1, to make effective use of the light. A scattering-reinforcing layer as made from light-diffusing ink was not used at all on the rear surface of the light guide 1; only the separate reflective film 3 was installed.

Fluorescent lamps usually used as backlight sources are used as the fluorescent lamps 2. The intensity of light scattered perpendicularly to the exit surface was measured with a colorimeter manufactured by MINOLTA CAMERA CO., LTD, and it was confirmed that the scattered light was emitted forward with a brightness of about 6416 candelas from the whole surface of the light-scattering light guide. Although any scattering-reinforcing device having a mesh pattern or dot pattern was not used, about a bright/dark ratio of about 84% was obtained. In this way, it was confirmed that a two-dimensional light source of high uniformity was accomplished.

When two sheets of prism film was laid on top of each other, a brightness of about 7117 candelas and a bright/dark ratio of 90% were obtained. This demonstrates that the superposing the sheets of prism film improves the illumination intensity and its uniformity.

This can be explained by the following principle. The prism film Bef (brand name) manufactured by Three-M Co., Ltd. was used. This prism film is made from polycarbonate and has a refractive index of 1.59.

Let us consider a case where the direction of the normal to the exit surface is at 90°; the direction away from the lamps be at 0°; and the prism surface faces forward. In this case, due to the directivity of the light-scattering light guide, the light emitted in a direction of 35° is converted into light traveling in a direction of 60° by the first sheet of light exit direction-modifying device in accordance with the above-described principle. The light is further converted into light propagating in a direction of 84° by the second sheet of light exit direction-modifying device. That is, the direction of the outgoing light is modified to a direction close to 90°. This means that the brightness as viewed from the front of the light-scattering light guide is improved.

On the other hand, a commercially available conventional light-scattering light-guiding device which comprises a light-scattering light guide made from methacrylic resin, the light guide with a light-diffusing layer formed on its underside by screen printing, and a light-scattering plate installed on the side of the exit surface, was used for measuring the intensity of scattered light under the same conditions as in the above-described measurements. The result indicated that the illuminance intensity was about 4052 candelas.

The same prism film, or a light exit surface-modifying device, was installed in the above device to obtain a structure composed of three components, i.e., the PMMA light guide plate having a light-diffusing layer formed by screen printing, the light-diffusing plate, and the prism film. In this case, the illuminance intensity was 5253 candelas.

The value of the aforementioned 6416 candelas of the structure comprising the light-scattering light guide and the two sheets of prism film exceeds this value of 5253 candelas. Thus, this indicates that even with the structure simpler than conventional, i.e., requiring neither screen printing nor a light-diffusing plate, increases the illuminance intensity can be increased by as much as 22%.

Where an additional sheet of prism film was added to the three-component structure, that is, in the case of four-component structure (i.e., comprising the PMMA light guide plate having a light-diffusing layer formed by screen printing, the light-diffusing plate, and two sheets of prism film), the illumination intensity was 5590 candelas. That is, the increase of the illumination intensity achieved by the providing the second prism film is only 337 candelas.

Furthermore where the second prism film was added to the two-component structure consisting of the light-scattering light guide and the prism film, the illumination intensity was increased from the above-described 6416 candelas to 7117 candelas by as much as 701 candelas. This result demonstrates that the combination of the light-scattering light guide and the prism film, or the light exit direction-modifying device, is quite advantageous.

The viewing angle is described now. Since the peak of the light going out of the light-scattering light guide in the present example is around 35°, if a prism film whose prism vertical angle is around 48° is used as the first prism film, then the direction of the outgoing light is modified to the direction of 90°, i.e., the forward direction. Such condition, for example, is well suited for a backlight source of a liquid crystal display for use with an ordinary desktop computer.

Where it is necessary to increase the viewing angle to some extent as is the case where the device is applied to a TFT liquid crystal display TV set, more desirable results can be obtained by taking the following measures.

A sheet of prism film for causing the peak of the light going out of the light-scattering light guide to deviate considerably from 90°-direction is used. A light source is installed on each side of the light-scattering light guide shown in FIG. 3. This means that the prism film (i.e., the direction-modifying device for modifying the direction to the 90°-direction) used to obtain curve b shown in FIG. 5 is replaced by the prism film for modifying the direction so as to deviate considerably from the 90°-direction. Hence, a curve formed by stretching the curve b of FIG. 5 to both sides should be obtained. In other words, the viewing angle can be controlled while exploiting the action of the light exit direction-modifying device, by using two lamps, without the need to employ a light-diffusing plate.

It is to be noted that the present invention totally precludes the use of a light-diffusing plate for 10 appropriately increasing the viewing angle. More particularly, if the conventional light-diffusing plate is disposed between the light-scattering light guide and the light exit direction-modifying device or on this modifying device, it is a natural consequence that the viewing angle is increased by the light-diffusion action of the light-diffusing plate. Even in such a case, however, it is one of the advantages of the present invention that the direction of the center of the directivity of the outgoing light can be controlled, and, if necessary, the sharpness of the directivity can be reduced.

The correlation distance a of the light-scattering light guide used in the present example is equal to 0.53 μm. The effective scattering illumination parameter E estimated, using formula (11) above, is 12.6 cm$^{-1}$.

EXAMPLE 2

First, 0.3% by weight of powdered silicone resin (such as Tospal 108 manufactured by Toshiba Silicon) having a particle diameter of 0.8 μm was added to MMA, and spherical particles in which the powder was uniformly dispersed were obtained by a well-known suspension polymerization process. In the same way as in Example 1, the particles were pelletized by a pelletizer. In this way, pellets in which the powdered silicone resin was uniformly dispersed were prepared.

Thereafter, a planar light-scattering light guide of the same type as the light guide of Example 1 was obtained under the same conditions as in Example 1. This light-scattering light guide could hardly be distinguished by appearance from the light-scattering light guide obtained in Example 1. The results of various measurements performed under the same conditions as in Example 1 indicate no substantial differences from the results of the measurements performed in this Example 2.

In the case of the present example too, the correlation distance a of the light-scattering light guide was 0.53 μm, and the effective scattering illumination parameter E estimated, using formula (11) above, was 12.6 cm$^{-1}$.

EXAMPLE 3

Using a homogenizer, 2.2 g of benzoyl peroxide, 12 ml of chlorodecane, 10 ml of dichloroethane, and 0.25 g of Na-lauryl sulfate were emulsified in 80 ml of water, whereby an emulsion consisting of particles having a diameter of 0.1 to 0.2 μm was prepared. This emulsion was added to 90 ml of seed latex of monodisperse polystyrene having a particle diameter of 0.55 μm and a concentration of 8.5% by weight. In addition, 20 ml of water and 15 ml of acetone were added at a temperature of from 35° C. to 40° C. The materials were stirred at 40° C. for 12 hours. Thereafter, the acetone and dichloroethane were removed by vacuum distillation.

Then, 1.2 g of Na-lauryl sulfate was added, and the mixture was then diluted with water to obtain a liquid totaling 1.2 liters. Thereafter, 65 g of styrene, 171 g of methyl methacrylate, 45 g of butyl acrylate, and 9 g of trimethylolpropane triacrylate were added while stirring them at 30° C. Moreover, the mixture was stirred at 30° C. for 15 hours. Thereafter, the temperature was raised to 60° C. to initiate polymerization, and the polymerization, and the was continued for 25 hours. As a result, an organic cross-linked particulate material having an average particle diameter of 2.8 μm and a refractive index of 1.502 was obtained.

A copolymer was produced by polymerizing methyl methacrylate (MMA) and trifluoroethyl methacrylate (3FMA) at 1:1 ratio. Then, 0.5% by weight of the above-described particulate material was added to 1 kg of the copolymer. The mixture was sufficiently kneaded with a mixer. Then, the mixture was forced through a nozzle having a diameter of 20 mm by an extruding machine. The extruded mixture was cut to a length of 50 mm, and both ends were cut and ground to obtain a cylindrical light-scattering light guide.

With respect to the obtained light-scattering light guide, the correlation distance a and the dielectric constant fluctuation squares mean τ were calculated, using the Debye's relational formulas to obtain the results that a=1.87 μm and τ=0.0000808. The effective scattering illumination parameter E was calculated, using formula (10). The result is that $E=44.03$ cm$^{-1}$.

When a He-Ne laser beam having a diameter of about 1 mm was introduced from one end surface of this cylindrical light-scattering light guide, scattered light observed throughout the whole surface of the light guide was so even that no brightness ununiformity was recognizable with the naked eyes. A light spot corresponding to the laser beam was not visually recognized when the end surface was observed. That is, it was confirmed that almost whole incident light was converted into scattered light of high uniformity.

EXAMPLE 4

First, 0.5% by weight of polystyrene (PSt) was added to polymethyl methacrylate (PMMA). The materials were mixed up with a V-type tumbler for 10 minutes and then with a Henschel mixer for 5 minutes. A two-screw extruder having a diameter of 30 mm such as an extruder manufactured by Nakatani Machine Co., Ltd, Japan, was used to melt and mix the materials at a cylinder [temperature of from 220° C. to 250° C., at a screw rotational frequency of 75 rpm, and at a delivery rate of 6 kg/hr. In this way, pellets were created.

A light-scattering light guide in the form of a flat plate was molded from these pellets with an injection molding machine at a cylinder temperature of 220° C. to 250° C., a mold temperature of 65° C., at a moderate injection speed, and at an injection pressure equal to the short shot pressure plus 10 kg/cm². The obtained light guide measured 35×35×4.5 mm.

This light-scattering light guide was used as the light-scattering light guide i in the arrangement shown in FIG. 2, and the fundamental structure of the light-scattering light guide was built. A prism film having a vertical angle of about 110° was used as the light exit direction-modifying device 4. Reflective film (not shown) was placed around each fluorescent lamp 2 except for the sides facing the light-scattering light guide 1, to make effective use of the light. A scattering-reinforcing layer as made from light-diffusing ink was by no means formed on the rear surface of the light guide 1; only the separate reflective film 3 was positioned.

The fluorescent lamps 2 used in Example 1 were used as the fluorescent lamps 2. The intensity of scattered light was measured. It was confirmed that scattered light was emitted forward with a brightness of about 6500 candelas throughout the whole surface of the light-scattering light guide. Although any scattering-reinforcing device such as a mesh pattern or dot pattern was not used, an illumination intensity uniformity bright/dark ratio of about 80% was obtained. In this way, it was confirmed that a two-dimensional light source of high uniformity was accomplished.

INDUSTRIAL APPLICABILITY

As described thus far, according to the present invention, complication and bulkiness of an device which would have been difficult to avoid by the prior art techniques can be circumvented, and so a light-scattering light-guiding device which has a quite simple structure, a bright and uniform light-emitting surface, and is easy to manufacture can be provided.

Also, according to the invention, a light-scattering light-guiding device which consumes only a small amount of electric power by using a light exit direction-modifying device and has an especially bright light-emitting surface, can be realized.

Furthermore, according to the invention, a novel type of light-scattering light guide is provided; the materials of the light-scattering light guide or a light-scattering light-guiding device incorporating the guide can be selected from a wider range than heretofore; and in manufacturing the devices and the light guide, quite common injection molding or extrusion molding can be used as a process for molding a plastic material. This leads to such advantages as a decrease in the manufacturing cost of the light-scattering light guide or the light-scattering light-guiding device.

Since the inventive light-scattering light-guiding device according to the present invention has such fundamental advantages, it can find extensive optical application, including a backlight arrangement for a liquid crystal display or the like, a backlight source for an automobile or the like, and various illumination systems using solar light or a conventional illumination light source as a primary light source.

I claim:

1. A light-scattering light-guiding device comprising:

a plate-shaped light-scattering light guide having at least one side surface region for receiving light, a light exit surface for emitting outgoing light in an oblique direction, and a volume region having a substantially uniform scattering power, said volume region having an effective scattering illumination parameter E whose value lies in a range of 0.45 cm$^{-1}$≦E≦100 cm$^{-1}$, and a nonuniform refractive index structure for producing said scattering power, said nonuniform refractive index structure being expressed by a correlation function γ (r) approximated by exp (−r/a), where r is a distance between two points in said volume region and a is a correlation distance whose value lies in a range of 0.01 μm≦a≦50 μm, and said nonuniform refractive index structure being particulate material uniformly dispersed in a matrix, the refractive index of said particulate material being different from the refractive index of the matrix 0.001 or more.

2. A light scattering light-guiding device according to claim 1, wherein outgoing light emitted from the light exit surface is emitted at a direction of 30°–40° with respect to the direction light travels when received by the at least one side surface region.-

3. A light-scattering light-guiding device comprising:

a plate shaped light-scattering light guide having at least one side surface region for receiving light, a light exit surface for emitting outgoing light in a first direction, and a volume region having a substantially uniform scattering power, said volume region having an effective scattering illumination parameter E whose value lies in a range of 0.45 cm$^{-1}$≦E≦100 cm$^{-1}$, and a nonuniform refractive index structure for producing said scattering power, said nonuniform refractive index structure being expressed by a correlation function γ (r) approximated by exp (−R/a), where r is a distance between two points in said volume region and a is a correlation distance whose value lies in a range of 0.01 μm≦a≦50 μm, and said nonuniform refractive index structure being particulate material uniformly dispersed in a matrix, the refractive index of said particulate material being different from the refractive index of the matrix by 0.001 or more; and a light exit direction modifying prismatic element disposed along the light exit surface for changing the direction of the emitted light from the first direction to a second direction.

4. A light scattering light guiding device according to claim 3, wherein the second direction is perpendicular to the light exit surface.

\* \* \* \* \*

UNITED STATES PATENT AND TRADEMARK OFFICE
CERTIFICATE OF CORRECTION

PATENT NO. : 5,548,670
DATED : August 20, 1996
INVENTOR(S) : Yasuhiro KOIKE

It is certified that error appears in the above-indentified patent and that said Letters Patent is hereby corrected as shown below:

Cover page, Item [57], Abstract, line 9, change "R/A" to --r/a--.

Col. 5, line 20, change "D" to --E--.

Col. 6, equation (5), change "v" (third occurrence) and insert --θ--;
line 18, change "v" (first and second occurrence) to --θ--.

Col. 7, line 14, delete "[" (first occurrence).

Col. 14, line 22, delete "10".

Col. 16, line 2, change "i" to --1--.

Col. 17, line 7, after "matrix" insert --by--.

Col. 18, line 5, change "R" to --r--.

Signed and Sealed this

Seventeenth Day of December, 1996

Attest:

BRUCE LEHMAN

Attesting Officer

Commissioner of Patents and Trademarks